US012710940B2

(12) United States Patent
Lee et al.

(10) Patent No.: US 12,710,940 B2
(45) Date of Patent: Aug. 18, 2026

(54) AUTOMATED PROFILING AND PARTITIONING OF FUNCTIONS

(71) Applicant: Cisco Technology, Inc., San Jose, CA (US)

(72) Inventors: Myungjin Lee, Bellevue, WA (US); Ramana Rao V. R. Kompella, Foster City, CA (US)

(73) Assignee: Cisco Technology, Inc., San Jose, CA (US)

(*) Notice: Subject to any disclaimer, the term of this patent is extended or adjusted under 35 U.S.C. 154(b) by 289 days.

(21) Appl. No.: 18/385,555

(22) Filed: Oct. 31, 2023

(65) Prior Publication Data

US 2025/0138794 A1 May 1, 2025

(51) Int. Cl.
*G06F 8/41* (2018.01)

(52) U.S. Cl.
CPC .................................... *G06F 8/433* (2013.01)

(58) Field of Classification Search
CPC ....................................................... G06F 8/433
See application file for complete search history.

(56) References Cited

U.S. PATENT DOCUMENTS 9,569,341 B1 * 2/2017 van Schaik ......... G06F 11/3688
9,753,845 B1 * 9/2017 van Schaik ......... G06F 11/3608
11,425,002 B1 * 8/2022 Miocevic ............ G06F 9/44542
11,467,826 B1 * 10/2022 Chawda .................. G06F 9/547
11,663,115 B2 * 5/2023 Xiao ..................... G06F 11/323
717/124
11,778,053 B1 * 10/2023 Allen ...................... H04L 67/34
709/220
11,860,980 B2 * 1/2024 Gao ........................ G06F 18/29
12,288,044 B2 * 4/2025 Kaul ......................... G06F 8/30
2017/0255545 A1 * 9/2017 Voccio ................ G06F 11/3636

(Continued)

FOREIGN PATENT DOCUMENTS

CN 116662146 A * 8/2023 .......... G06F 11/3644
WO WO-2021050875 A1 * 3/2021 .......... G06F 11/1471

OTHER PUBLICATIONS

Desai, Utkarsh, Sambaran Bandyopadhyay, and Srikanth Tamilselvam. "Graph neural network to dilute outliers for refactoring monolith application." Proceedings of the AAAI conference on artificial intelligence. vol. 35. No. 1. 2021.*

(Continued)

*Primary Examiner* — Francisco J Aponte
(74) *Attorney, Agent, or Firm* — Lee & Hayes, P.C.

(57) ABSTRACT

In one implementation, a method is disclosed comprising: identifying, by a device, a plurality of functions within a source code based on one or more programmatic annotations of each of the plurality of functions within the source code; monitoring, by the device, execution characteristics associated with each of the plurality of functions within the source code during execution; constructing, by the device, a function call graph from the plurality of functions wherein each particular function in the function call graph is annotated with corresponding execution characteristics; and partitioning, by the device and based on the function call graph and one or more deployment specifications, the plurality of functions within the source code into singularly executable function capsules that meet the one or more deployment specifications.

20 Claims, 8 Drawing Sheets

(56) References Cited

U.S. PATENT DOCUMENTS

| | | | | |
|---|---|---|---|---|
| 2018/0173502 | A1* | 6/2018 | Biskup | G06F 21/56 |
| 2018/0196867 | A1* | 7/2018 | Wiesmaier | G06F 9/5038 |
| 2019/0108067 | A1* | 4/2019 | Ishikawa | H04L 41/50 |
| 2020/0192789 | A1* | 6/2020 | Peng | G06F 16/904 |
| 2021/0149668 | A1* | 5/2021 | Gupta | G06F 9/547 |
| 2021/0263779 | A1 | 8/2021 | Haghighat et al. | |
| 2022/0116455 | A1 | 4/2022 | Raghunath et al. | |
| 2022/0129540 | A1 | 4/2022 | Sheriff et al. | |
| 2022/0188104 | A1* | 6/2022 | Wan | G06F 9/547 |
| 2023/0083849 | A1 | 3/2023 | Sanchez | |
| 2025/0021329 | A1* | 1/2025 | Yotam | G06F 8/71 |
| 2025/0021403 | A1* | 1/2025 | Yotam | G06F 9/5083 |

OTHER PUBLICATIONS

Schirmer, Trever, et al. "Fusionize++: Improving serverless application performance using dynamic task inlining and infrastructure optimization." IEEE Transactions on Cloud Computing 12.4 (2024): 1172-1185.*

Mammadli, Nihad, et al. "DDS: integrating data analytics transformations in task-based workflows." Open Research Europe 2 (2023).*

Abdi M., et al., "Palette Load Balancing: Locality Hints for Serverless Functions", EuroSys '23, Proceedings of the Eighteenth European Conference on Computer Systems, May 9-12, 2023, 16 Pages.

Github: "PrincetonUniversity/Faas-profiler", 2023, 5 Pages.

Kehoe B., "The Need for Asynchronous FaaS Call Chains in Serverless Systems", Medium, Jun. 21, 2017, 19 Pages.

Mahgoub A., et al., "ORION and the Three Rights: Sizing, Bundling, and Prewarming for Serverless DAGs", USENIX Association, 16th USENIX Symposium on Operating Systems Design and Implementation, Jul. 11-13, 2022, pp. 303-320.

Szalay M., et al., "Real-Time FaaS: Towards a Latency Bounded Serverless Cloud", IEEE Transactions on Cloud Computing, Feb. 14, 2022, 15 Pages.

Szalay M., et al., "Real-time Task Scheduling in a FaaS cloud", 2021 IEEE 14th International Conference on Cloud Computing (CLOUD), Sep. 5-10, 2021, pp. 497-507.

Wen J., et al., "Rise of the Planet of Serverless Computing: A Systematic Review", arXiv:2206.12275v5 [cs.SE], Dec. 16, 2022, 60 Pages.

* cited by examiner

AUTOMATED PROFILING AND PARTITIONING OF FUNCTIONS

TECHNICAL FIELD

The present disclosure relates generally to computer networks, and, more particularly, to automated profiling and partitioning of functions.

BACKGROUND

Serverless computing, or function as a service (FaaS), has arisen as a compelling paradigm by which to run applications. In practice, a function may be a unit of execution that is instantiated in an event-driven fashion. Multiple functions may be connected together to perform larger tasks. For instance, a plurality of functions can be chained as a directed acyclic graph (DAG) to carry out a larger task. Once each function is executed, the computational resource dedicated to its execution may be released, thus facilitating efficient computation resource utilization.

However, there are challenges associated with running applications within the FaaS paradigm. For instance, developers are required to decide the scope and/or role of individual functions and then implement them. Unfortunately, these developers cannot accurately predict the resource footprint of each function during its development. As such, computational resource distribution and utilization among the functions is inefficient and unnecessarily derogatory of system performance.

Further, computational resource distribution and utilization inefficiency can necessitate manual refactoring of functions in a DAG, which further degrades and delays system development, implementation, and improvement. Furthermore, many legacy applications are not implemented in a FaaS-friendly manner and refactoring them as a function chain to adapt to the paradigm can be a resource consuming endeavor that further degrades and delays development, implementation, and improvement of applications.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a method is introduced herein that facilitates the automated profiling and partitioning of functions. The method includes identifying functions within source code based on programmatic annotations within that source code. Then, execution of characteristics of those functions may be profiled through monitoring during execution of the functions and used to annotate a function call graph of the functions. Ultimately, the functions may be partitioned, based on the function call graph, into singularly executable function capsules that meet deployment specifications.

Other implementations are described below, and this overview is not meant to limit the scope of the present disclosure.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Figure 1:
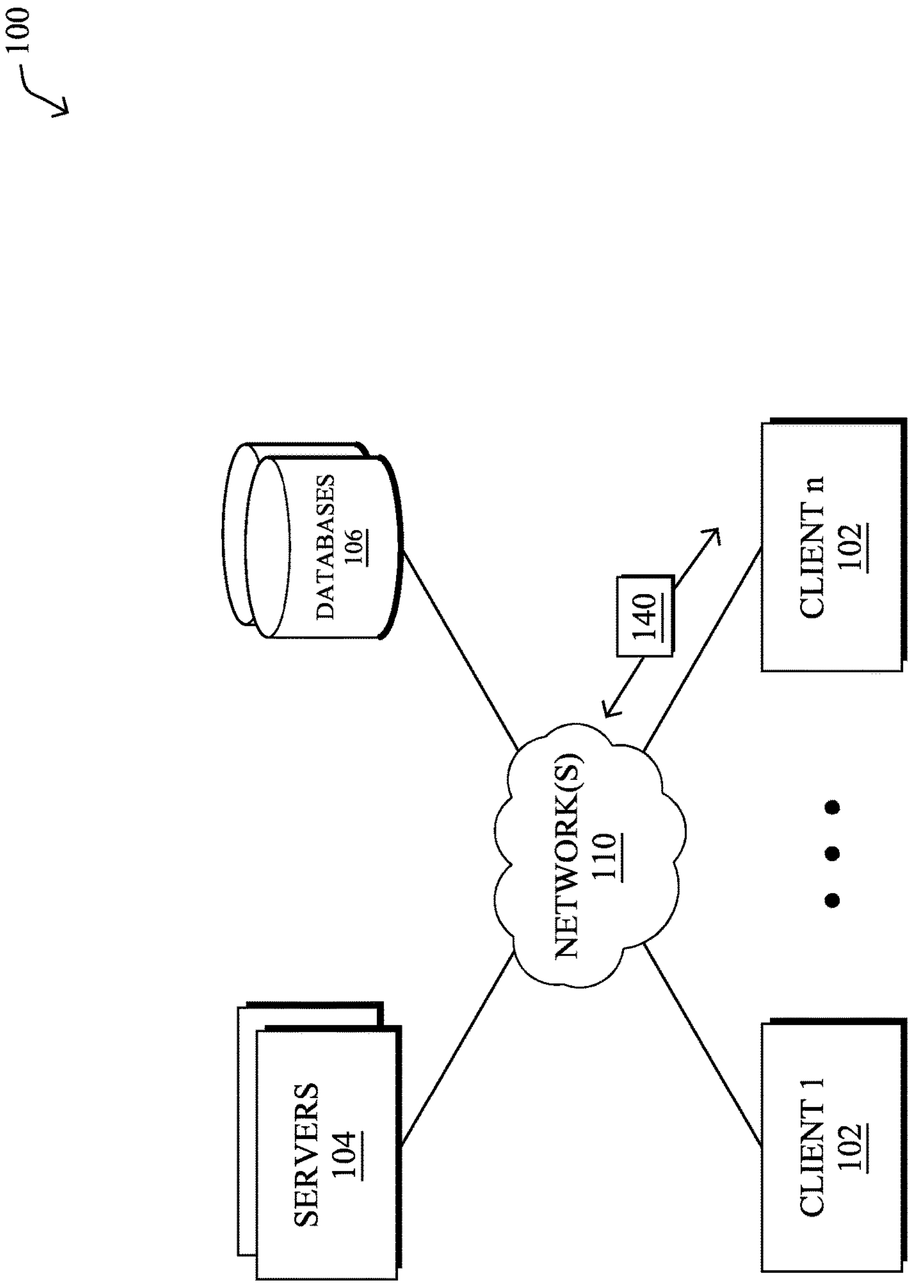
FIG. 1 illustrates an example of a computing system.

FIG. 1 is a schematic block diagram of an example simplified computing system 100 illustratively comprising any number of the client devices 102 (e.g., a first through nth client device), one or more of servers 104, and one or more of databases 106, where the devices may be in communication with one another via any number of networks (e.g., networks 110). The one or more networks (e.g., networks 110) may include, as would be appreciated, any number of specialized networking devices such as routers, switches, access points, etc., interconnected via wired and/or wireless connections. For example, devices 102-104 and/or the intermediary devices in network(s) (e.g., networks 110) may communicate wirelessly via links based on WiFi, cellular, infrared, radio, near-field communication, satellite, or the like. Other such connections may use hardwired links, e.g., Ethernet, fiber optic, etc. The nodes/devices typically communicate over the network by exchanging discrete frames or packets of data (packets 140) according to predefined protocols, such as the Transmission Control Protocol/Internet Protocol (TCP/IP) other suitable data structures, protocols, and/or signals. In this context, a protocol consists of a set of rules defining how the nodes interact with each other.

Client devices 102 may include any number of user devices or end point devices configured to interface with the techniques herein. For example, client devices 102 may include, but are not limited to, desktop computers, laptop computers, tablet devices, smart phones, wearable devices (e.g., heads up devices, smart watches, etc.), set-top devices, smart televisions, Internet of Things (IoT) devices, autonomous devices, or any other form of computing device capable of participating with other devices via network(s) (e.g., networks 110).

Notably, in some implementations, servers 104 and/or databases 106, including any number of other suitable devices (e.g., firewalls, gateways, and so on) may be part of a cloud-based service. In such cases, the servers and/or databases 106 may represent the cloud-based device(s) that provide certain services described herein, and may be distributed, localized (e.g., on the premise of an enterprise, or "on prem"), or any combination of suitable configurations, as will be understood in the art.

Those skilled in the art will also understand that any number of nodes, devices, links, etc. may be used in simplified computing system 100, and that the view shown herein is for simplicity. Also, those skilled in the art will further understand that while the network is shown in a certain orientation, the simplified computing system 100 is merely an example illustration that is not meant to limit the disclosure.

Notably, web services can be used to provide communications between electronic and/or computing devices over a network, such as the Internet. A web site is an example of a type of web service. A web site is typically a set of related web pages that can be served from a web domain. A web site can be hosted on a web server. A publicly accessible web site can generally be accessed via a network, such as the Internet. The publicly accessible collection of web sites is generally referred to as the World Wide Web (WWW).

Also, cloud computing generally refers to the use of computing resources (e.g., hardware and software) that are delivered as a service over a network (e.g., typically, the Internet). Cloud computing includes using remote services to provide a user's data, software, and computation.

Moreover, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a Software as a Service (SaaS) over a network, such as the Internet.

Figure 2:
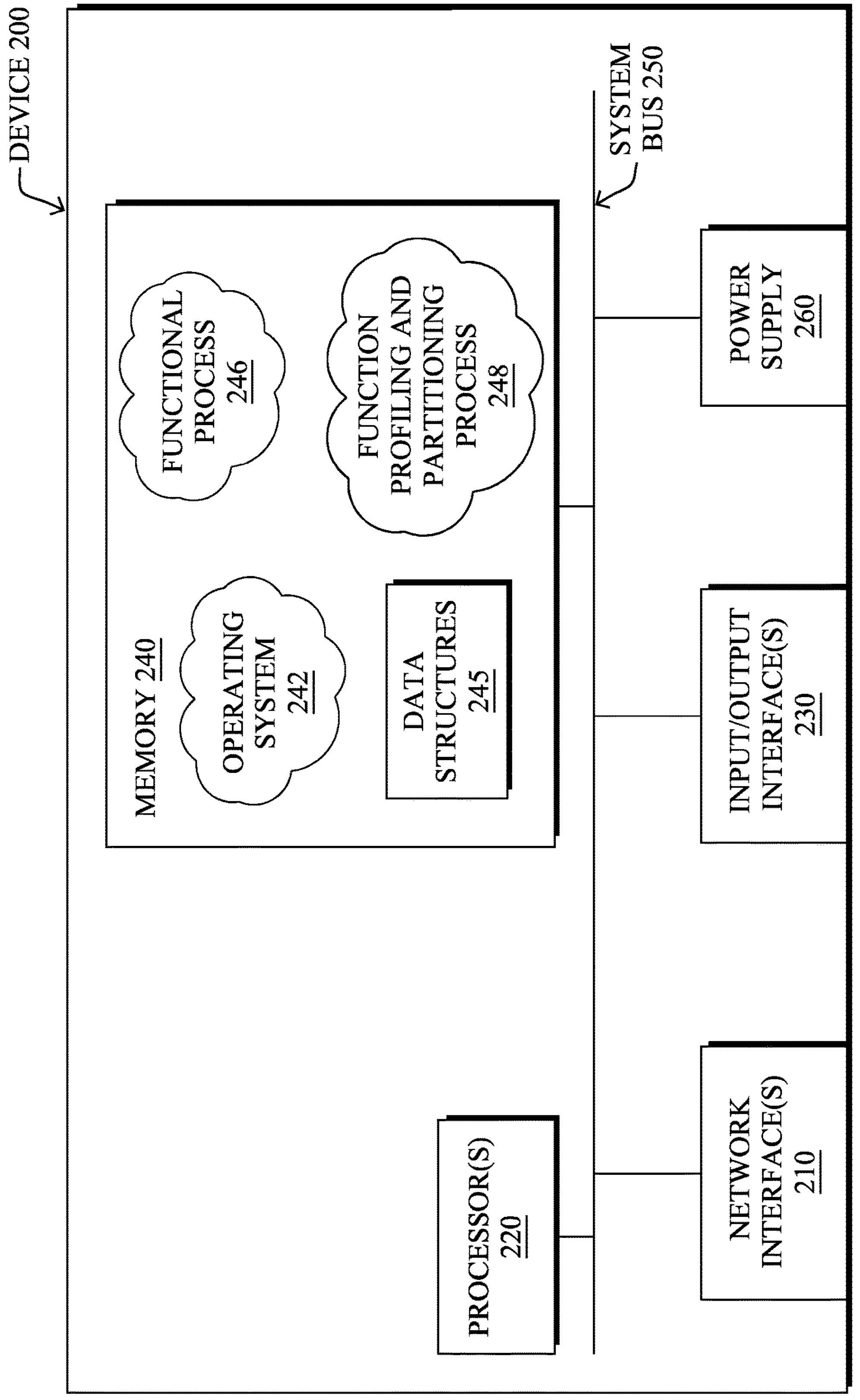
FIG. 2 illustrates an example of a computing device/node.

FIG. 2 is a schematic block diagram of an example node/device 200 that may be utilized with one or more implementations described herein, e.g., as any of the devices 102-106 shown in FIG. 1 described above as well as the present disclosure described below. Device 200 may comprise one or more network interfaces (e.g., network interfaces 210) (e.g., wired, wireless, etc.), at least one processor (e.g., processor 220), and a memory 240 interconnected by a system bus 250, as well as a power supply 260 (e.g., battery, plug-in, etc.).

The network interface(s) (e.g., network interfaces 210) contain the mechanical, electrical, and signaling circuitry for communicating data over links coupled to the network(s) (e.g., networks 110). The network interfaces may be configured to transmit and/or receive data using a variety of different communication protocols. Note, further, that device 200 may have multiple types of network connections via network interfaces 210, e.g., wireless and wired/physical connections, and that the view herein is merely for illustration.

Depending on the type of device, other interfaces, such as input/output (I/O) interfaces 230, user interfaces (UIs), and so on, may also be present on the device. Input devices, in particular, may include an alpha-numeric keypad (e.g., a keyboard) for inputting alpha-numeric and other information, a pointing device (e.g., a mouse, a trackball, stylus, or cursor direction keys), a touchscreen, a microphone, a camera, and so on. Additionally, output devices may include speakers, printers, particular network interfaces, monitors, etc.

The memory 240 comprises a plurality of storage locations that are addressable by the processor 220 and the network interfaces 210 for storing software programs and data structures associated with the implementations described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise one or more of functional processes 246, and on certain devices, a function profiling and partitioning process 248, as described herein. Notably, functional processes 246, when executed by processor(s) (e.g., processor 220), cause each particular device (e.g., device 200) to perform the various functions corresponding to the particular device's purpose and general configuration. For example, a router would be configured to operate as a router, a server would be configured to operate as a server, an access point (or gateway) would be configured to operate as an access point (or gateway), a client device would be configured to operate as a client device, and so on.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Figure 3:
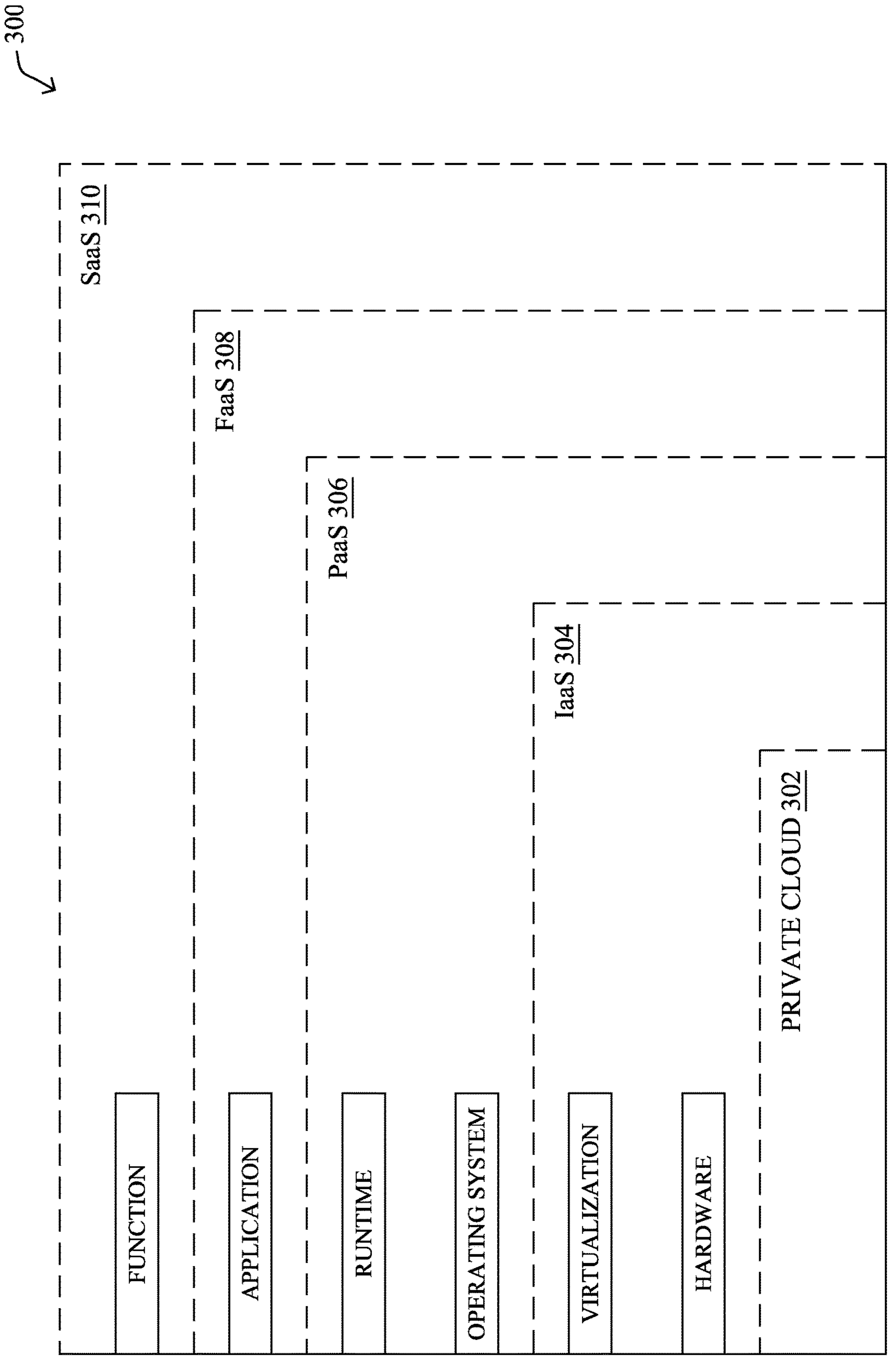
FIG. 3 illustrates an example of an IT stack layer abstraction among various service models.

FIG. 3 illustrates an example of an IT stack 300 layer abstraction among various service models, in accordance with various implementations herein. IT software stack may include hardware, virtualization, operating system, runtime, application, and/or function layers. Within the private cloud service model 302, all of these layers are on-premises, owned, and/or managed by an application provider. IT agility is low while platform cost is high when owning and/or managing the entire IT stack in this manner.

In contrast, an infrastructure as a service (IaaS) service model 304 abstracts the lower infrastructure layers (e.g., hardware, virtualization, etc.) of the IT stack 300. This allows the infrastructure layers to be rented from a cloud service provider. It is typically much more cost efficient to not own and operate these layers and it increases application provision/revision efficiency.

Next, there is a platform as a service (PaaS) service model 306, which takes the abstraction further by additionally abstracting the runtime and operating system layers of the IT stack 300. This leaves an application provider free to focus on providing the application further improving cost efficiency and application provision/revision efficiency.

In function as a service (FaaS) service model 308 the IT stack 300 abstraction is expanded such that even the application itself is abstracted. By abstracting the application layer, an application provider is able to focus on the functions which are the individual components (e.g., individual tasks, uploading a file, etc.) that actually make up the application. The result is zero idle time freeing the application provider from even needing a server since that is all managed and taken care of by a service provider. Even further cost efficiency and application provision/revision efficiency improvements are realized under this service model.

Software as a Service (SaaS) service model abstracts all the depicted layers of IT stack 300 including the functions. Here, centrally hosted software may be accessed online with a subscription rather than being owned or managed by a customer on premises.

—Automated Profiling and Partitioning of Functions—

As noted above, there are various challenges associated with running applications within the FaaS paradigm that result in the distribution and utilization of computational resources in a manner that ultimately degrades the functionality of applications, systems, and/or the computational resources executing them. There is simply no reliable mechanism by which a developer can anticipate the computational resource demands of a function during its development. For example, workload variance, frequency of invocation, input data characteristics, the volume of data processed or generate by a function, the influence of external dependencies, the frequency and duration of cold starts, platform-imposed resource constraints, platform optimization techniques, environmental changes, etc. are examples of inherently dynamic factors influencing a resource footprint of a function which may not be able to be anticipated by developers during development. As a result, there is often a performance degrading mismatch between resource requirements and resource allocations among functions.

In contrast, the techniques herein introduce mechanisms for automated profiling and partitioning of functions. By first profiling code to produce a function call chain and then partitioning the code in a manner that meets the resource constraints of the deployment, these techniques provide for the efficient distribution of computational resource and the execution of serverless/FaaS code.

Illustratively, the techniques described herein may be performed by hardware, software, and/or firmware, such as in accordance with the function profiling and partitioning process 248, which may include computer executable instructions executed by the processor 220 (or independent processor of network interfaces 210) to perform functions relating to the techniques described herein, e.g., in conjunction with functional processes 246.

Specifically, according to one or more embodiments of the disclosure as described in detail below, a method may include identifying, by a device, a plurality of functions within a source code based on one or more programmatic annotations of each of the plurality of functions within the source code; monitoring, by the device, execution characteristics associated with each of the plurality of functions within the source code during execution; constructing, by the device, a function call graph from the plurality of functions wherein each particular function in the function call graph is annotated with corresponding execution characteristics; and partitioning, by the device and based on the function call graph and one or more deployment specifications, the plurality of functions within the source code into singularly executable function capsules that meet the one or more deployment specifications.

Figure 4:
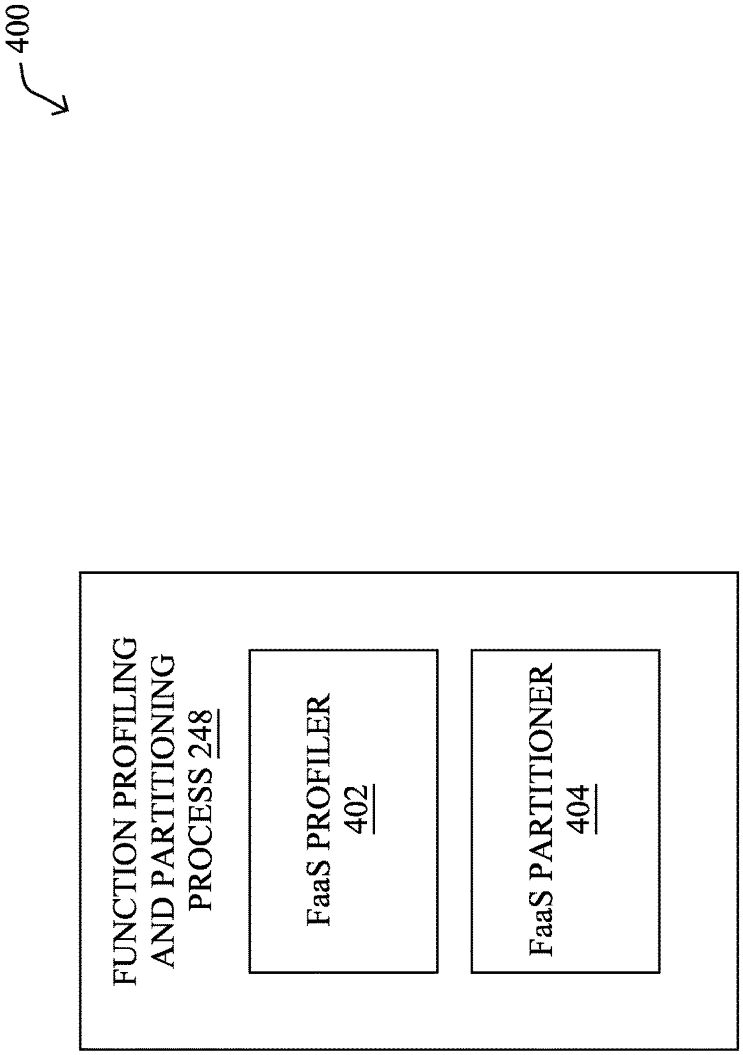
FIG. 4 illustrates an example of an architecture for automated profiling and partitioning of functions.

Operationally and according to various implementations, FIG. 4 illustrates an example of an architecture 400 for automated profiling and partitioning of functions, in accordance with various implementations herein. At the core of architecture 400 is function profiling and partitioning process 248, which may be executed by one or more devices. For example, function profiling and partitioning process 248 may be executed by a network controller, an edge device, an IoT device, an IoT controller, an equipment controller, a computing device, a server, cloud computing resources, etc.

As shown, function profiling and partitioning process 248 may include FaaS profiler 402, and/or FaaS partitioner 404. As would be appreciated, the functionalities of these components may be combined or omitted, as desired. In addition, these components may be implemented on a singular device or in a distributed manner, in which case the combination of executing device can be viewed as their own singular device for purposes of executing function profiling and partitioning process 248.

The components of function profiling and partitioning process 248 may be executable to profile functions within source code and then partition those functions into singularly executable function capsules based on the profiles and/or deployment specifications.

For example, when executing, FaaS profiler 402 may identify a plurality of functions within a source code being subjected to analysis. The source code may include source code of a software application. In various instances, the application may be first implemented by a developer either monolithically or in a FaaS manner.

This source code may be annotated with one or more programmatic annotations. For example, given a source code is presented, a developer can annotate the source code with a programmatic annotation such as a decorator (e.g., @profile). While various implementations are described in terms of the Python candidate language for consistency among examples and ease of articulation, it should be appreciated that any language can support a functionality of a programmatic annotation similar to Python's decorator.

The FaaS profiler 402 may identify each of the plurality of functions. This identification may be based upon their programmatic annotations within the source code. For example, for each decorated function, the FaaS profiler 402 may identify it individually by its decoration.

Then, FaaS profiler 402 may monitor execution characteristics associated with each of the functions within the source code during its execution. For example, for each decorated function, the FaaS profiler 402 may utilize a function's decorator during a runtime profiling phase to collect its execution characteristics, which may include resource utilization metrics such as CPU utilization, memory usage, execution time, throughput, etc.

FaaS profiler 402 may construct a function call graph from the plurality of functions. For example, FaaS profiler 402 may leverage function call tracing mechanisms to construct the function call graph. The function call graph may be a directed acyclic graph (DAG). The function call graph may be augmented. For example, each of the functions in the function call graph may be annotated with their corresponding execution characteristics.

When executing, FaaS partitioner 404 may partition the plurality of functions within the source code into singularly executable function capsules. This partitioning may be based on the augmented function call graph and/or one more deployment specification.

A developer or other entity (e.g., resource provider, resource subscription manager, etc.) may specify a deployment specification for the functions. In some instances, the deployment specification may be determined automatically from data inputs. The deployment specification may specify various requirements (e.g., number of partitions, network bandwidth, etc.) to be utilized for the deployment of the functions.

FaaS partitioner 404 may take the augmented function call graph and/or the deployment specification as inputs. It may utilize these inputs to group the functions in the augmented function call graph into capsules that meet the requirements specified in the deployment specification. In grouping these functions, FaaS partitioner 404 may incorporate consideration of, among other things, whether there are loops in the function call graph. Since a loop cannot exist in, for example, a DAG, functions that form a loop in the function call graph are grouped as a single execution unit. Each execution unit may be referred to as a function "capsule."

For each function capsule, the FaaS partitioner 404 may also show the function execution specification. The function execution specification of each function capsule may include that function capsule's required amount of resources (e.g., number of CPUs/GPUs, amount of memory, etc.) and the potential resulting performance metrics (e.g., throughput, delay, etc.). Each function capsule may be deployed as a single unit in an FaaS service (e.g., AWS Step Functions).

Since each function capsule may contain more than one function, the FaaS partitioner 404 may ensure that all the outputs are transferred to the next function capsule in a correct order via a synthesized link. The resulting partition (e.g., including function execution specifications, synthesized link details, etc.) may be displayed to a developer for approval. If the developer is not satisfied with the partitions, they can change the deployment specification and retry as a change to the deployment specification may trigger a repartitioning of the functions.

Figure 5:
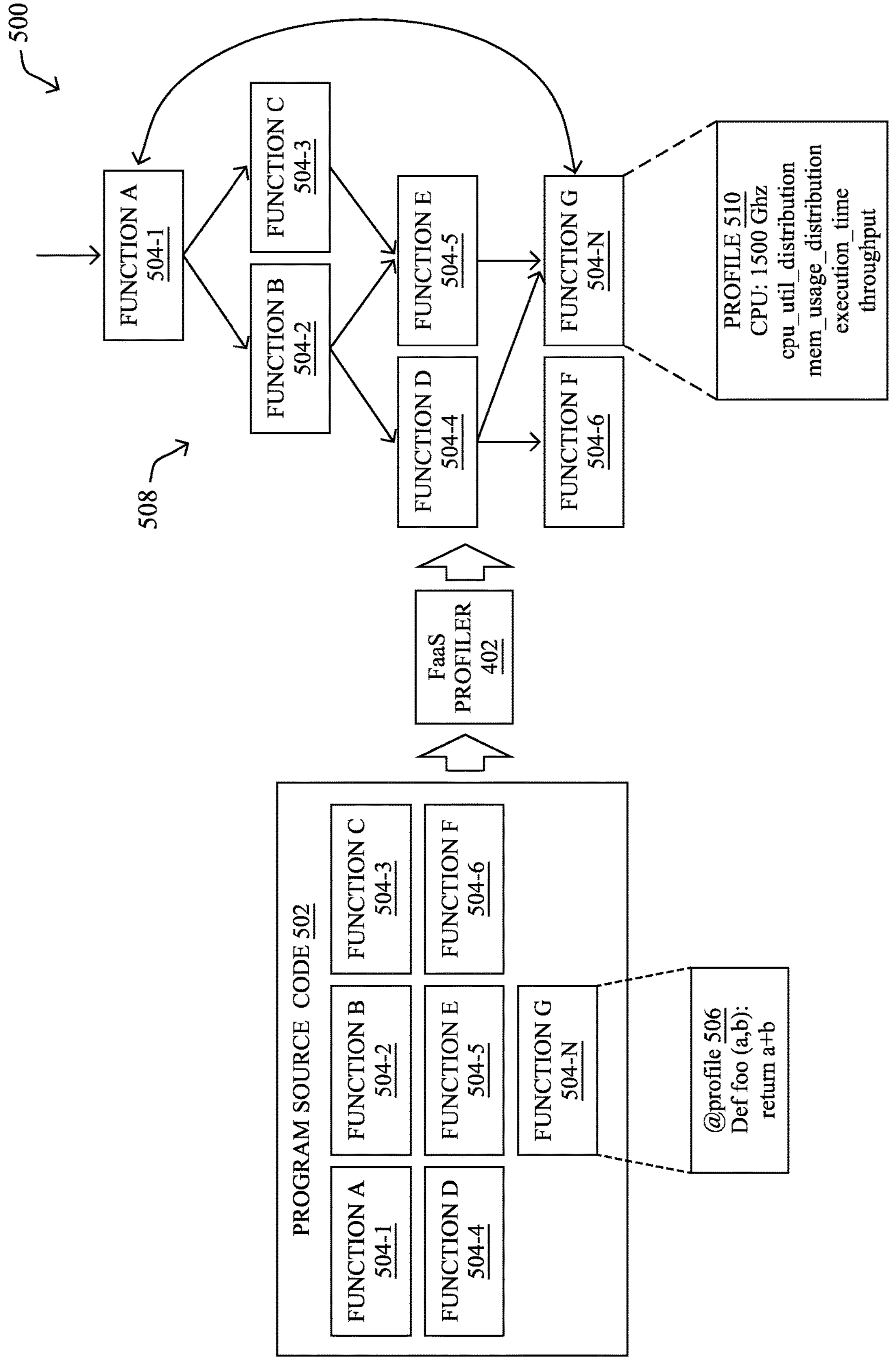
FIG. 5 illustrates an example of an execution of an FaaS profiler.

FIG. 5 illustrates an example of an execution 500 of FaaS profiler 402, in accordance with various implementations herein. FaaS profiler 402 may analyze program source code 502 of an application to identify each of its constituent functions (e.g., functions 504 (e.g., 504-1 . . . 504-N)). Each of the functions 504 may include a programmatic annotation such as a decorator 506. Using the decorator 506, FaaS profiler 402 may identify a particular function and/or collect its execution characteristics such as CPU utilization metrics, memory usage metrics, execution time metrics, throughput metrics, etc. by using the decorator 506 during a runtime profiling phase. This may be performed for each of the functions 504 that include the decorator 506.

FaaS profiler 402 then constructs an augmented function call graph 508 leveraging call tracing mechanisms. The augmented function call graph 508 may be a DAG that is augmented with a profile 510 for each of its constituent functions (e.g., functions 504). Profile 510 may include the collected execution characteristics for its corresponding function. The augmented function call graph 508 may be provided to FaaS partitioner 404 for further processing.

Figure 6:
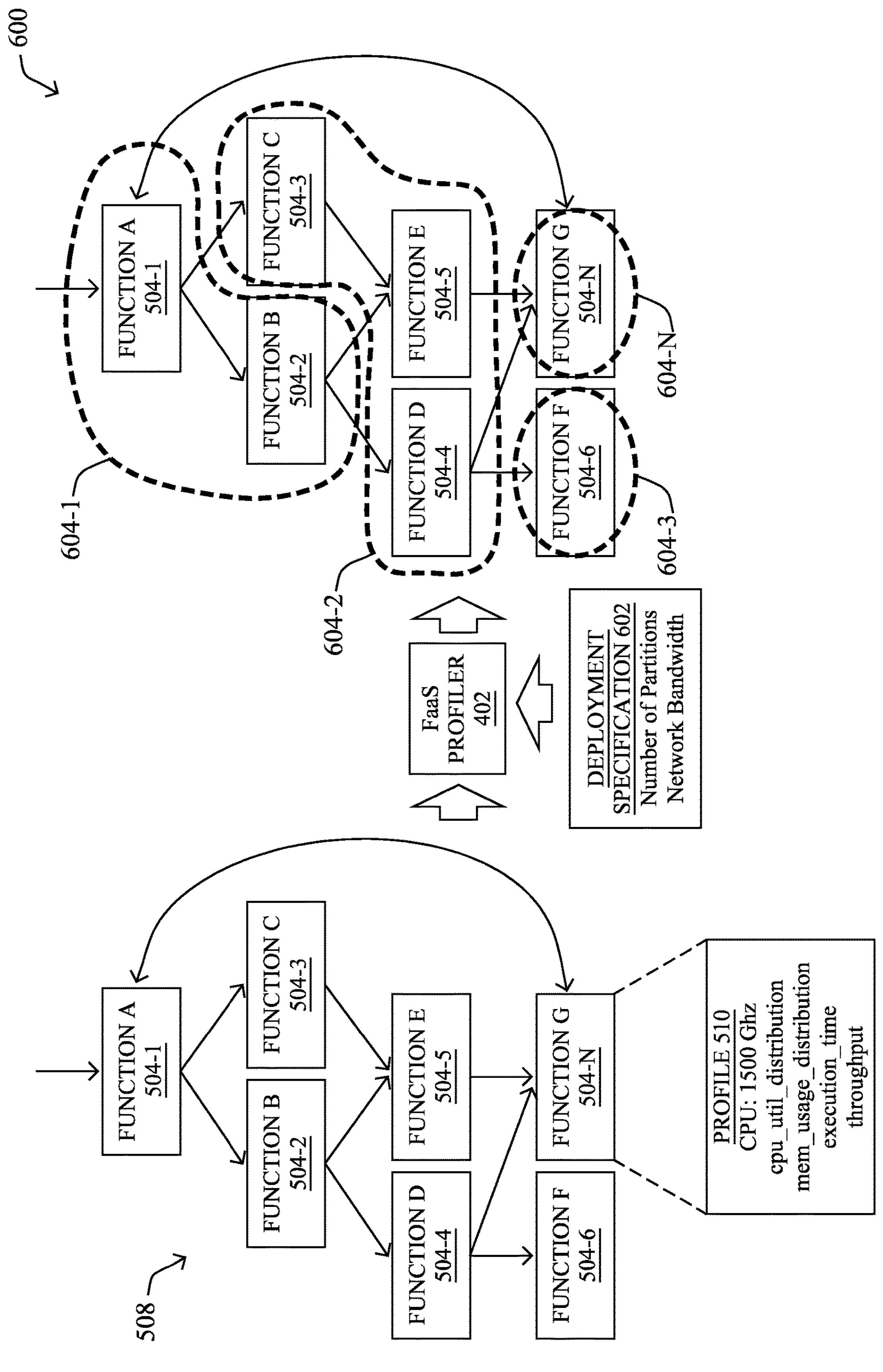
FIG. 6 illustrates an example of an execution of an FaaS partitioner.

FIG. 6 illustrates an example of an execution 600 of FaaS partitioner 404, in accordance with various implementations herein. FaaS partitioner 404 may take augmented function call graph 508 as an input. In addition, FaaS partitioner 404 may take a deployment specification 602 as an input. The deployment specification 602 may specify a number of partitions requirement, a network bandwidth requirement, and/or other requirements of the deployment.

Utilizing these inputs, FaaS partitioner 404 may group the functions 504 in a manner such that the groupings meet the requirements of deployment specification 602. For example, FaaS partitioner 404 may compare the profiles of each of the functions 504 with the requirements of the deployment specification 602 to identify function grouping that will facilitate an execution that adheres to the requirements of the deployment specification 602. FaaS partitioner 404 may group the functions 504 in a manner that considers whether there is a loop in the graph since loops cannot exist in a DAG (e.g., functions that form a loop are grouped into an independent execution unit).

Each of these groups or execution units may be function capsules 604 (e.g., 604-1 . . . 604-N). Each of these function capsules 604 may be deployed as a single and/or independently executable unit in an FaaS service. More than one function may be included in a single function capsule.

Figure 7:
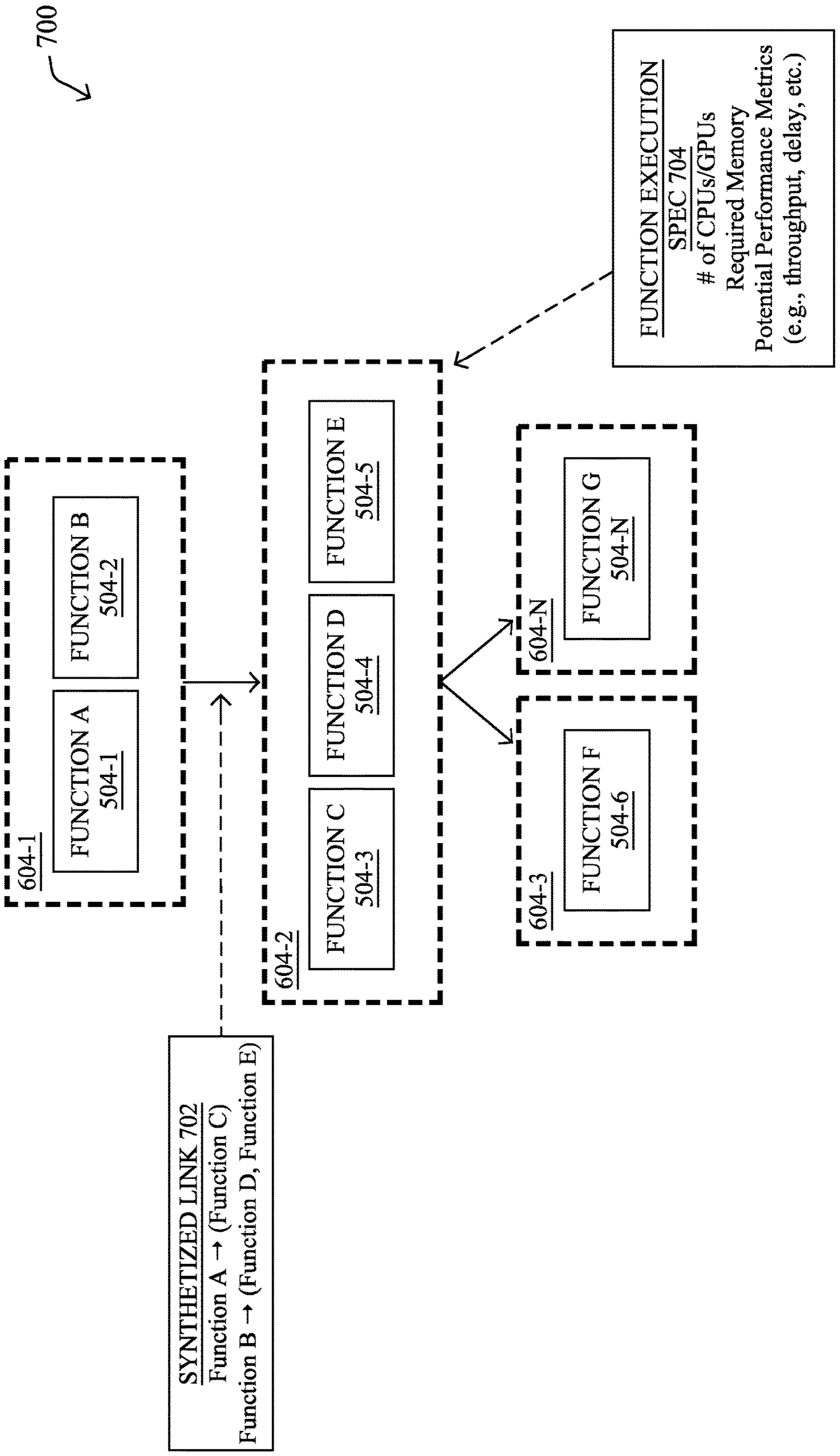
FIG. 7 illustrates an example of a partitioning of functions in application source code.

FIG. 7 illustrates an example of a partitioning 700 of functions 504 (e.g., 504-1 . . . 504-N) in application source code, in accordance with various implementations herein. Partitioning 700 illustrates each of the functions 504 within its respective functional capsule.

Since a given function capsule may contain more than one function, the FaaS partitioner ensures that all the outputs are transferred to the next function capsule in a correct order by establishing a synthesized link 702. Details associated with the synthesized link 702 may be included in the partitioning 700 (e.g., as an annotation to a graphical representation of the partitioning 700).

In addition, the partitioning 700 may also include a function execution specification 704 for each of the function capsules 604. Function execution specification 704 may include the required amount resources (e.g., the amount of CPUs, GPUs, memory, etc.) and/or the potential performance metrics (e.g., throughput, delay, etc.) associated with the corresponding function capsule. The function execution specification 704 may be included in the partitioning 700 as an annotation to a graphical representation of the partitioning 700.

Partitioning 700 may be automatically applied and/or provided to a user (e.g., as a graphical representation of the partitioning 700) for their analysis and/or approval before application. If the user is not satisfied with the partitions proposed in the partitioning 700, then they may modify it. The partitioning 700 may be modified by modification of the deployment specification 602. A FaaS partitioner may then repartition the functions 504 according to the modified deployment specification.

Figure 8:
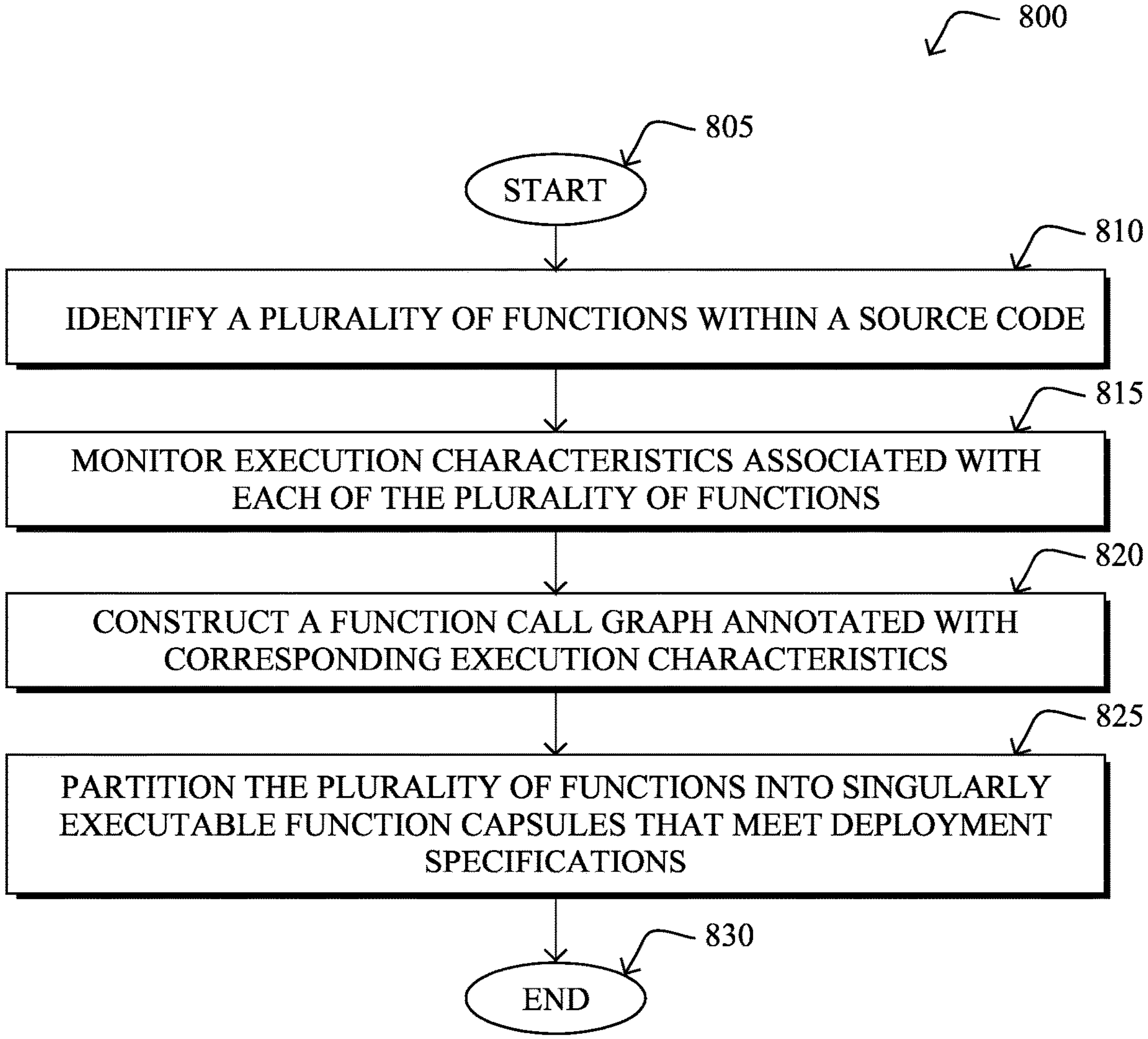
FIG. 8 illustrates an example simplified procedure for automated profiling and partitioning of functions.

FIG. 8 illustrates an example simplified procedure for automated profiling and partitioning of functions in a network in accordance with one or more implementations described herein. For example, a non-generic, specifically configured device (e.g., device 200) may perform procedure 800 by executing stored instructions (e.g., function profiling and partitioning process 248).

The procedure 800 may start at step 805, and continues to step 810, where, as described in greater detail above, a plurality of functions may be identified within a source code. The functions may be identified based on one or more programmatic annotations associated with each of the plurality of functions within the source code. The programmatic annotations may be code decorators.

At step 815, as detailed above, execution characteristics associated with each of the plurality of functions within the source code may be monitored during their execution. For example, metrics such as CPU utilization, memory usage, execution time, throughput, etc. may be collected for each of the plurality of decorated functions utilizing their code decorators.

At step 820, a function call graph may be constructed from the plurality of functions. Each of the plurality of functions appearing in the function call graph may be annotated with their corresponding execution characteristics. The function call graph may be an annotated directed acyclic graph.

As detailed above, at step 825, the plurality of functions within the source code may be partitioned into singularly executable function capsules. The partitioning may be based on the functional call graph and/or one or more deployment specifications. The functions may be partitioned into function capsules that meet the one or more deployment specifications.

The function capsule may be deployed as function as a service. A single function capsule may include more than one of the plurality of functions within the source code. Even so, the function capsule including the plurality of functions may be deployed as a single unit in a FaaS service.

Further, loop forming functions may be identified from among the plurality of functions within the source code. Then, the plurality of functions may be partitioned such that the loop forming functions are isolated within a singularly executable function capsule that is separate from other functions of the plurality of functions.

In addition, a function execution specification for each of the singularly executable function capsules may be generated. Each function execution specification may specify a resource requirement and/or a forecasted performance metric for a corresponding function capsule. These function execution specifications may be included as an annotation within a graphical representation of the partitioning presented to a user.

Furthermore, all outputs of a first function capsule may be transferred to a next function capsule in a correct order by a synthesized link. Details of the synthesized link may be included as an annotation within a graphical representation of the partitioning presented to a user as confirmation of this synthesized link.

Repartitioning may be performed as well. For example, a user may review the graphical representation of the partitioning and, if they are unhappy with the partitioning, trigger a repartitioning of the functions by modifying a deployment specification. For instance, a particular function of the plurality of functions may be repartitioned into a different singularly executable function capsule than a function capsule to which it was previously partitioned based on a modification to the one or more deployment specifications.

Procedure 800 then ends at step 830.

It should be noted that while certain steps within procedure 800 may be optional as described above, the steps shown in FIG. 8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, facilitate automated profiling and partitioning of functions for serverless computing. The techniques herein provide for the efficient execution of serverless/FaaS code by first profiling the code to produce a function call chain and then partitioning the code that meets the resource constraints of the deployment. By profiling the functions, this system is equipped to understand the intrinsic characteristics of functions in an application so that function chain composition may be automated. Therefore, developers can annotate those methods that they want to be monitored and considered to build a function capsule which may operate equivalently to a function in FaaS.

According to the implementations herein, an illustrative method herein may comprise: identifying, by a device, a plurality of functions within a source code based on one or more programmatic annotations of each of the plurality of functions within the source code; monitoring, by the device, execution characteristics associated with each of the plurality of functions within the source code during execution; constructing, by the device, a function call graph from the plurality of functions wherein each particular function in the function call graph is annotated with corresponding execution characteristics; and partitioning, by the device and based on the function call graph and one or more deployment specifications, the plurality of functions within the source code into singularly executable function capsules that meet the one or more deployment specifications.

In one implementation, the method may further comprise generating a function execution specification for each of the singularly executable function capsules. In one implementation, each function execution specification includes at least one of a resource requirement or a forecasted performance metric for a corresponding function capsule. In one implementation, the method may further comprise confirming that all outputs of a first function capsule are transferred to a next function capsule in a correct order by a synthesized link.

In one implementation, each function capsule is deployed as function as a service. In one implementation, the one or more programmatic annotations are code decorators. In one implementation, the function call graph is an annotated directed acyclic graph. In one implementation, a single function capsule includes more than one of the plurality of functions within the source code.

In one implementation, the method may further comprise identifying loop forming functions from among the plurality of functions within the source code. In one implementation, the method may further comprise partitioning the plurality of functions such that the loop forming functions are isolated within a singularly executable function capsule separate from other functions of the plurality of functions. In one implementation, the method may further comprise repartitioning a particular function of the plurality of functions into a different singularly executable function capsule based on a modification to the one or more deployment specifications.

According to the implementations herein, an illustrative tangible, non-transitory, computer-readable medium having computer-executable instructions stored thereon that, when executed by a processor on a computer, cause the computer to perform a method comprising: identifying a plurality of functions within a source code based on one or more programmatic annotations of each of the plurality of functions within the source code; monitoring execution characteristics associated with each of the plurality of functions within the source code during execution; constructing a function call graph from the plurality of functions wherein each particular function in the function call graph is annotated with corresponding execution characteristics; and partitioning, based on the function call graph and one or more deployment specifications, the plurality of functions within the source code into singularly executable function capsules that meet the one or more deployment specifications.

According to the implementations herein, an illustrative apparatus comprising: one or more network interfaces to communicate with a network; a processor coupled to the one or more network interfaces and configured to execute one or more processes; and a memory configured to store a process that is executable by the processor, the process, when executed, configured to: identify a plurality of functions within a source code based on one or more programmatic annotations of each of the plurality of functions within the source code; monitor execution characteristics associated with each of the plurality of functions within the source code during execution; construct a function call graph from the plurality of functions wherein each particular function in the function call graph is annotated with corresponding execution characteristics; and partition, based on the function call graph and one or more deployment specifications, the plurality of functions within the source code into singularly executable function capsules that meet the one or more deployment specifications.

While there have been shown and described illustrative embodiments that provide for automated profiling and partitioning of functions for serverless computing, it is to be understood that various other adaptations and modifications may be made within the spirit and scope of the embodiments herein. For example, while certain embodiments are described herein with respect to using certain languages (e.g., Python). However, the implementations are not so limited as such, and other languages may be utilized in other implementations. Likewise, programmatic annotations other than Python's decorators may be utilized in other implementations.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:

identifying, by a device, a plurality of functions within a source code based on one or more programmatic annotations of each of the plurality of functions within the source code;

monitoring, by the device, execution characteristics associated with each of the plurality of functions within the source code during execution;

constructing, by the device, a function call graph from the plurality of functions wherein each particular function in the function call graph is annotated with corresponding execution characteristics;

partitioning, by the device and based on the function call graph and one or more deployment specifications, the plurality of functions within the source code into singularly executable function capsules that meet the one or more deployment specifications; and repartitioning a particular function of the plurality of functions into a different singularly executable function capsule based on a modification to the one or more deployment specifications.

2. The method of claim 1, further comprising:

generating a function execution specification for each of the singularly executable function capsules.

3. The method of claim 2, wherein each function execution specification includes at least one of a resource requirement or a forecasted performance metric for a corresponding function capsule.

4. The method of claim 1, further comprising:

confirming that all outputs of a first function capsule are transferred to a next function capsule in a correct order by a synthesized link.

5. The method of claim 1, wherein each function capsule is deployed as function as a service.

6. The method of claim 1, wherein the one or more programmatic annotations are code decorators.

7. The method of claim 1, wherein the function call graph is an annotated directed acyclic graph.

8. The method of claim 1, wherein a single function capsule includes more than one of the plurality of functions within the source code.

9. The method of claim 1, further comprising:

identifying loop forming functions from among the plurality of functions within the source code.

10. The method of claim 9, further comprising:

partitioning the plurality of functions such that the loop forming functions are isolated within a singularly executable function capsule separate from other functions of the plurality of functions.

11. A tangible, non-transitory, computer-readable medium having computer-executable instructions stored thereon that, when executed by a processor on a computer, cause the computer to perform a method comprising:

identifying a plurality of functions within a source code based on one or more programmatic annotations of each of the plurality of functions within the source code;

monitoring execution characteristics associated with each of the plurality of functions within the source code during execution;

constructing a function call graph from the plurality of functions wherein each particular function in the function call graph is annotated with corresponding execution characteristics;

partitioning, based on the function call graph and one or more deployment specifications, the plurality of functions within the source code into singularly executable function capsules that meet the one or more deployment specifications; and repartitioning a particular function of the plurality of functions into a different singularly executable function capsule based on a modification to the one or more deployment specifications.

12. The tangible, non-transitory, computer-readable medium as in claim 11, the method further comprising:

generating a function execution specification for each of the singularly executable function capsules.

13. The tangible, non-transitory, computer-readable medium as in claim 12, wherein each function execution specification includes at least one of a resource requirement or a forecasted performance metric for a corresponding function capsule.

14. The tangible, non-transitory, computer-readable medium as in claim 11, the method further comprising:

confirming that all outputs of a first function capsule are transferred to a next function capsule in a correct order by a synthesized link.

15. The tangible, non-transitory, computer-readable medium as in claim 11, wherein each function capsule is deployed as function as a service.

16. The tangible, non-transitory, computer-readable medium as in claim 11, wherein a single function capsule includes more than one of the plurality of functions within the source code.

17. The tangible, non-transitory, computer-readable medium as in claim 11, the method further comprising:

partitioning the plurality of functions such that loop forming functions are isolated within a singularly executable function capsule separate from other functions of the plurality of functions.

18. The tangible, non-transitory, computer-readable medium as in claim 11, wherein the function call graph is an annotated directed acyclic graph.

19. An apparatus, comprising:

one or more network interfaces to communicate with a network;

a processor coupled to the one or more network interfaces and configured to execute one or more processes; and a memory configured to store a process that is executable by the processor, the process, when executed, configured to:

identify a plurality of functions within a source code based on one or more programmatic annotations of each of the plurality of functions within the source code;

monitor execution characteristics associated with each of the plurality of functions within the source code during execution;

construct a function call graph from the plurality of functions wherein each particular function in the function call graph is annotated with corresponding execution characteristics;

partition, based on the function call graph and one or more deployment specifications, the plurality of functions within the source code into singularly executable function capsules that meet the one or more deployment specifications; and repartitioning a particular function of the plurality of functions into a different singularly executable function capsule based on a modification to the one or more deployment specifications.

20. The apparatus as in claim 19, the process further comprising:

generating a function execution specification for each of the singularly executable function capsules.

* * * * *